April 1, 1958  H. GROENDIJK  2,829,337
DEVICE FOR MEASURING VERY LOW GAS PRESSURES
Filed June 11, 1954
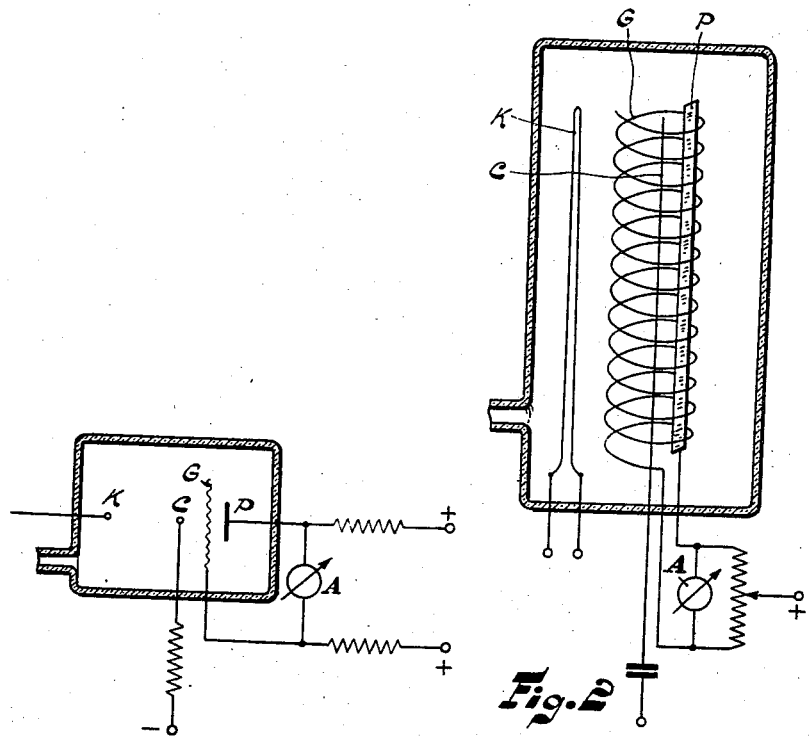
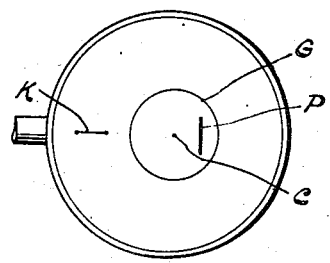
INVENTOR
HENDRIK GROENDIJK
BY
AGENT

United States Patent Office 2,829,337
Patented Apr. 1, 1958

2,829,337

DEVICE FOR MEASURING VERY LOW GAS PRESSURES

Hendrik Groendijk, Eindhoven, Netherlands, assignor, by mesne assignments, to North American Philips Company, Inc., New York, N. Y., a corporation of Delaware Application June 11, 1954, Serial No. 436,215

Claims priority, application Netherlands June 15, 1953

5 Claims. (Cl. 324—33)

For measuring very low gas pressures use is often made of an electrode system comprising an electron-emitting cathode, a grid-shaped electrode and a plate-shaped electrode, which system is housed in a container wherein the pressure is measured. The grid-shaped electrode has a given positive potential relative to the cathode and accelerates the electrons to enable ionisation of the gaseous atmosphere. The plate-shaped electrode has a negative potential and serves as a collector for the ions produced. The number of ions produced, hence the current flowing in the circuit of the plate-shaped electrode is, within definite limits, proportional to the gas pressure so that the latter can be measured by measuring the current.

Since very low gas pressures involve secondary phenomena so that the linear relationship between gas pressure and plate current gets lost, it has been proposed to modify the device in such a sense that the collector electrode is given a very small cross-section. This yields a device in which the helically wound grid-shaped electrode surrounds a cylindrical space, approximately in the axis whereof a filamentary collector extends. The cathode is provided outside said space and also extends approximately parallel to its axis. The emitted electrons pass through the meshes of the grid to said space. Apart from the immediate proximity of the collector electrode it may be taken for granted that the said space, within which ionisation occurs, is an equipotential space. This device permits of determining gas pressures of about $10^{-10}$ mm. mercury column. However, accurate measurements are comparatively difficult since the currents to be measured are extremely small.

The present invention relates to a device for measuring very low gas pressures, in which ionisation of the gas molecules is brought about in the space wherein the gas pressure is determined, the device comprising an electron-emitting cathode, a preferably grid-shaped electrode, which is at a constant potential relative to the cathode, and a collector electrode having a negative potential with regard to the cathode. The invention has for its object to provide a device permitting accurate measurements to be effected by simple means.

The invention is based on the recognition that the collector electrode has a deflecting influence on the electron current, which influence is sufficient to make perceptible comparatively small variations of the potential of the collector electrode. In accordance with the invention provision is made of a fourth electrode which also has a positive potential relative to the cathode and is so arranged with regard to the cathode and collector electrode as to collect a variable part of the electrons in accordance with the potential of the collector electrode.

The fourth electrode is preferably housed in the space surrounded by the grid-shaped electrode, and the collector electrode brings about distribution control of the electron current among the fourth electrode and the grid-shaped electrode. Either of these electrodes or both of them may be connected across a resistor to the positive terminal of a current source. For measuring the pressure either the potential of one of said electrodes or the potential difference between the electrodes may be determined, while the collector electrode is driven negative.

For this purpose the collector may be connected through a high resistor to a point of negative potential. In this case the plate current or the grid current is measured and from this value the collector potential is deduced. Preferably, however, a capacitor is connected between the collector and a point of constant potential, said capacitor being so charged or given such a voltage as to drive the collector negative. In this case the variation of the plate or grid current is measured, which is also a measure of the density of the gas.

With the device according to the invention it is advantageous that the collector electrode consists of a single conductor whose transverse dimension, at least at right angles to the principal direction of the electron current, is small relative to the cross-section of the electron current with the result that said electrode substantially exerts only a deflecting effect thereon.

In a suitable embodiment the grid-shaped electrode surrounds an ionisation space containing the collector electrode and preferably also said fourth electrode. The latter may alternatively be situated outside the ionisation space. The cathode is aranged outside said space at the collector side remote from the fourth electrode.

In order that the invention may be readily carried into effect, it will now be described with reference to the accompanying drawing in which:

Fig. 1 is a schematic representation of the measuring device of the invention;

Figs. 2 and 3 show, respectively, a side and top view of one form of measuring device of the invention.

Referring now to the drawing, K represents the filamentary cathode, C the filamentary collector electrode, G a grid and P a plate. The electrons issued by the cathode K ionize the gas surrounding the collector C which is connected through a high resistor to a point having a negative potential relative to the cathode. The assembly is housed in a part of the container in which the pressure of the gas is measured. Due to the ion current passing to the collector the latter attains a voltage which is less negative as the pressure of the gaseous atmosphere is higher. The collector has a deflecting effect on the electron current passing from the cathode to the grid and the anode, which current is smaller as the potential of the collector is less negative. The last-mentioned electrodes are also connected through high resistors to points having suitably chosen positive potentials. The current distribution among the grid and the plate is a measure of the pressure of the gaseous atmosphere and can be measured by means of the instrument A connected between said electrodes.

Alternatively two interconnected plates may be arranged one at each side of the plate of the cathode and the collector. In this case the plate current increases as the negative potential of the collector increases in absolute value.

Figs. 2 and 3 show a practical example. The helically wound grid G surrounds a cylindrical ionisation space, along the axis whereof the filamentary collector C extends. The plate P is also housed in said space and more particularly at the collector side remote from the cathode. In this arrangement also the plate will collect more electrons as the collector is at a lower negative potential. The measuring instrument, for example a microammeter, may again be connected between the grid and the anode, and both electrodes, similarly as the collector, are connected across resistors, whereof the values are high relative to the resistance of the measuring instrument, to points of constant potential. A potentiometer resistor, whereof the sliding contact is connected to the positive terminal of a supply, is preferably connected between the grid and the plate. This yields the advantage that the contact resistance of the sliding contact does not affect the indication, of the measuring instrument.

The device is particularly suitable for measurements with which the collector is connected through a capacitor to a point of fixed potential, for example to earth, and means are provided for so charging the capacitor as to drive the collector negative with regard to the cathode. Since the collector collects the positive ions, the negative potential will gradually decrease in absolute value. The rate at which this occurs is a measure of the degree of ionisation and consequently also of the pressure of the gas in the space surrounded by the grid. Said rate can be measured. Preferably, the time is measured in which the collector, after the capacitor has been charged or the voltage of the lowermost electrode of the capacitor has been reduced by a given value, resumes its initial negative potential at which the voltages across the grid and the plate are maintained constant. The instant at which this occurs can be measured by means of the microammeter.

Alternatively, after charging the capacitor, the sliding contact of the potentiometer may be displaced at such a speed between the grid and the plate that the reading of the microammeter remains constant. The rate at which the sliding contact is moved, depends upon the degree of the vacuum.

It is found that the current through the microammeter is very insensitive to plate voltage variations, so that the plate voltage need not be maintained constant with a high degree of accuracy. By surrounding the ends of the filament by an earthed screen the current can also be maintained substantially independent of the filament voltage.

In one embodiment, the ion current amounted to approximately $10^{-11}$ a. with an electron current of 1 ma., the voltage of the collector rising 1 volt per second with a value of 10 pf. of the capacity. This is easily compensated by means of the potentiometer.

What is claimed is:

1. A device for measuring low gas pressures comprising an envelope including means for communicating with the space wherein the gas pressure is to be measured, a hollow grid-like electrode in said envelope, an elongated thin collector electrode within said hollow grid-like electrode, an electron-emitting cathode in said envelope but outside said grid-like electrode, an additional electrode inside said grid-like electrode and positioned such that the collector electrode is disposed substantially between it and the cathode, means maintaining the additional and grid-like electrodes at a positive potential relative to the cathode and the collector electrode at a negative potential relative to the cathode, and means coupled to said additional electrode for abstracting electrical information therefrom concerning the amount of electron collection thereby.

2. A device as set forth in claim 1 wherein the collector electrode is a single wire of small cross-section.

3. A device as set forth in claim 1 wherein the last-named means includes a measuring instrument connected between the grid-like and additional electrodes.

4. A device as set forth in claim 3 wherein a potentiometer is connected in parallel with said measuring instrument, and means are provided connecting the tap of said potentiometer to a point of positive potential.

5. A device as set forth in claim 1 wherein a capacitor couples the collector electrode to a point of constant potential, and means are provided for driving the collector negative relative to the cathode.

References Cited in the file of this patent

UNITED STATES PATENTS

| | | |
|---|---|---|
| 2,334,356 | Salzberg et al. | Nov. 16, 1943 |
| 2,454,564 | Nelson | Nov. 23, 1948 |
| 2,560,952 | Herold | July 17, 1951 |
| 2,605,431 | Bayard | July 29, 1952 |